United States Patent [19]

Bhardwaj et al.

[11] Patent Number: 5,312,896
[45] Date of Patent: May 17, 1994

[54] METAL ION PORPHYRIN-CONTAINING POLY(IMIDE)

[75] Inventors: Tilak R. Bhardwaj, Chandigarh, India; Susanna C. Ventura, Mountain View; Subhash C. Narang, Redwood City, both of Calif.

[73] Assignee: SRI International, Menlo Park, Calif.

[21] Appl. No.: 958,916

[22] Filed: Oct. 9, 1992

[51] Int. Cl.[5] .................. C08G 69/26; C08G 73/10
[52] U.S. Cl. ...................................... 528/353; 528/26; 528/37; 528/125; 528/128; 528/171; 528/172; 528/173; 528/176; 528/182; 528/185; 528/188; 528/220; 528/228; 528/229; 528/350; 524/600
[58] Field of Search ............... 528/353, 220, 176, 229, 528/174, 173, 171, 172, 182, 125, 188, 128, 228, 185, 26, 37; 524/600

[56] References Cited

U.S. PATENT DOCUMENTS

| | | | |
|---|---|---|---|
| 4,458,004 | 7/1984 | Tanikawa | 430/270 |
| 4,499,260 | 2/1985 | Achar et al. | 528/229 |
| 4,605,607 | 8/1986 | Nikles et al. | 430/17 |
| 4,645,821 | 2/1987 | Malinge et al. | 528/229 |
| 4,649,189 | 3/1987 | Achar et al. | 528/220 |
| 4,816,386 | 3/1989 | Gotoh et al. | 430/495 |
| 5,091,502 | 2/1992 | Narang et al. | 528/229 |

FOREIGN PATENT DOCUMENTS 736102 8/1955 United Kingdom ............... 528/220

*Primary Examiner*—John Kight, III
*Assistant Examiner*—P. Hampton-Hightower
*Attorney, Agent, or Firm*—Phillips, Moore, Lempio & Finley

[57] ABSTRACT

The present invention relates to porphyrins and to metal ion-containing monomers and polymers. The monomer

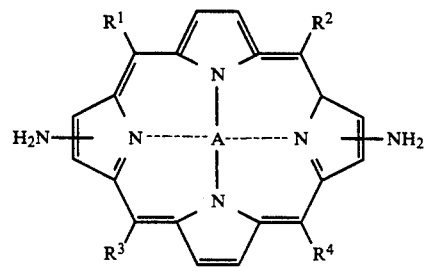

wherein A, $R^1$, $R^2$, $R^3$, and $R^4$ defined herein, is used with dianhydride to produce a porphyrin polymer or a metal ion containing porphyrin polymer. These polymers are useful as electrical conductors and as liquid crystal polymers, non-linear (NLO) materials, magnetic materials, electrochromic polymers photo-and electrocatalysts and advanced materials.

19 Claims, 5 Drawing Sheets

PREPARATION OF 5, 10, 15, 20-
$R^1$, $R^2$, $R^3$, $R^4$ - PORPHYRIN $R^1$, $R^2$, $R^3$, $R^4$ = PHENYL, et al

↓ ACETIC OR PROPIONIC ACID

II ($H_2$TPP)

PURIFICATION FROM CHLORIN BY
REACTION WITH DDQ

FIG. _1
PREPARATION OF 5, 10, 15, 20-
$R^1, R^2, R^3, R^4$ - PORPHYRIN
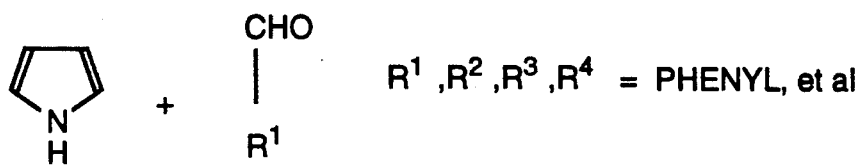
$R^1, R^2, R^3, R^4$ = PHENYL, et al
↓ ACETIC OR PROPIONIC ACID
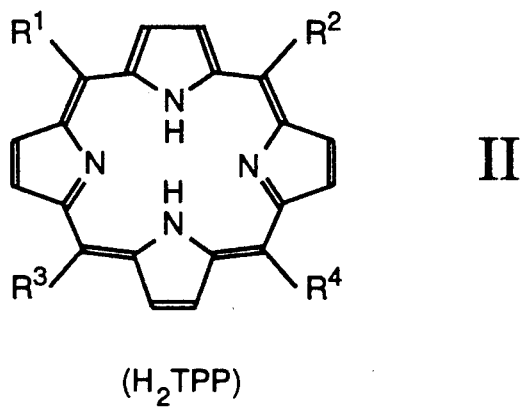
II
($H_2$TPP)
PURIFICATION FROM CHLORIN BY REACTION WITH DDQ
DDQ = 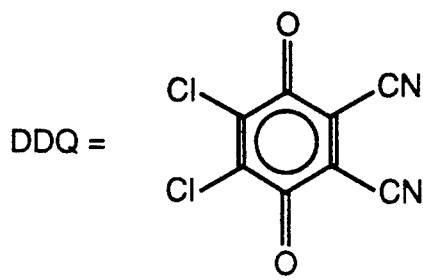

FIG. 2
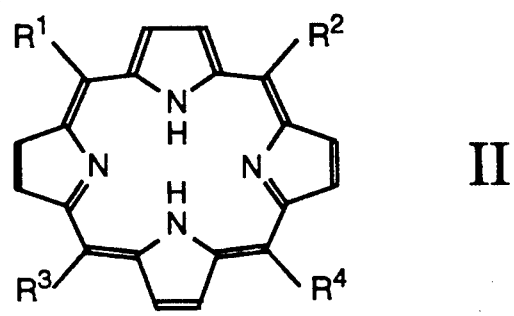
II
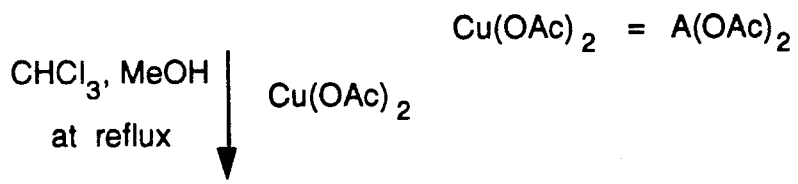
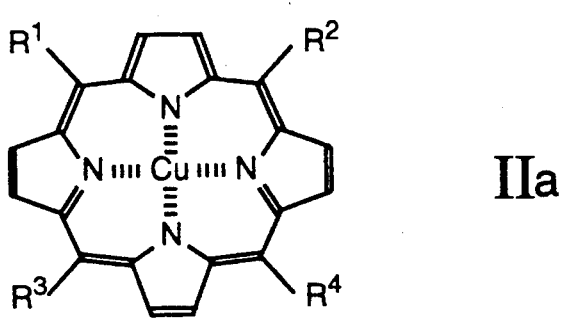
IIa

FIG._3
β-PYRROLIC NITRATION
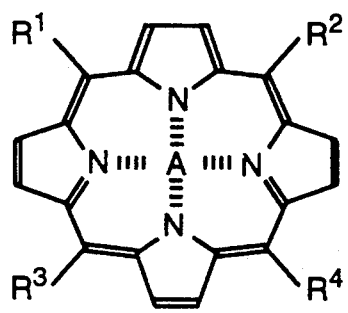
IIa
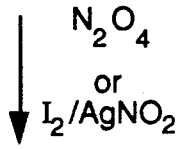
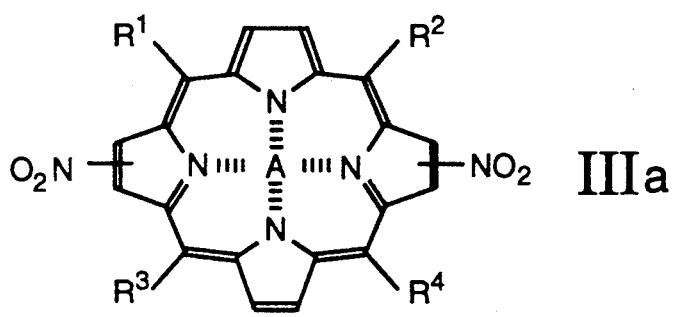
IIIa

FIG._4
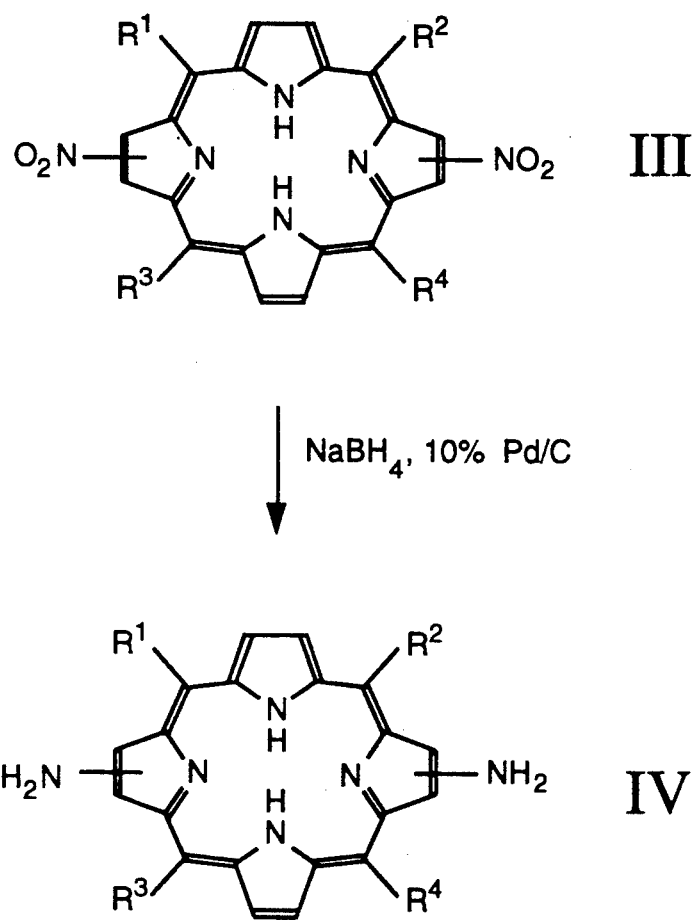

FIG._5
PREPARATION OF
METALLO-PORPHYRIN POLYMERS
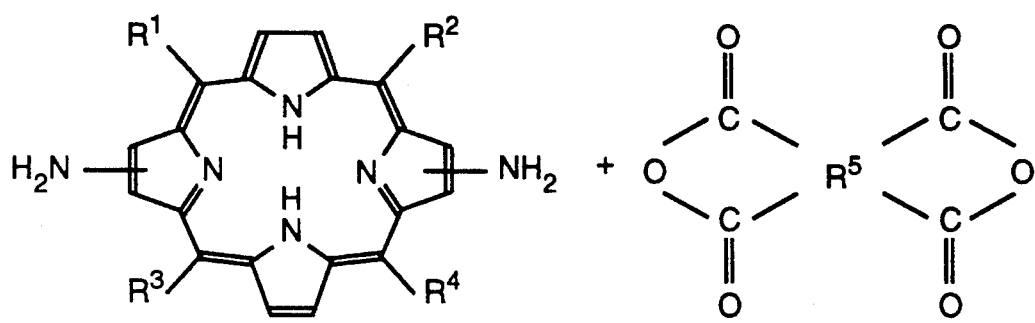
I
↓ 1. COUPLING
2. TREATMENT WITH METAL SALT-A
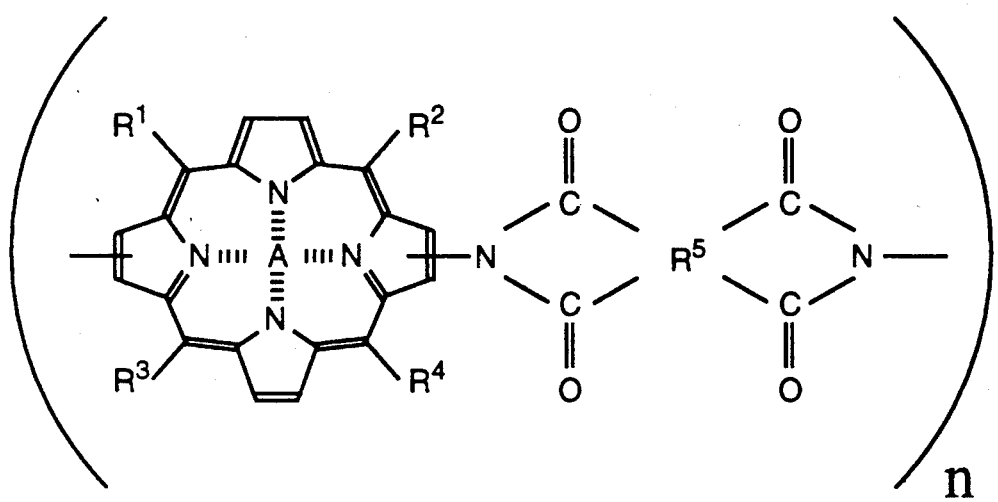

METAL ION PORPHYRIN-CONTAINING POLY(IMIDE)

BACKGROUND OF THE INVENTION

1. Field of Invention

The present invention relates to a porphyrin monomer, a porphyrin-containing poly(imide), and a metal ion porphyrin-containing poly(imide) and the process of formation thereof. More specifically, the invention relates to the preparation of specific porphyrin monomers having reactive diamine substituents, their reaction with dianhydrides, to produce polyporphyrin optionally containing one or more metal ions. The polymers are useful as semiconductors and electrically conducting films, non-linear optical (NLO) materials, sensor materials, magnetic materials, electrochromics polymers, photo and electrocatalysts and advanced structural materials.

2. Description Of Related Art

There is a strong demand for the development of metal ion containing organic polymers for a variety of advanced electrical, optical and structural applications. To synthesize useful metal ion containing polymers is often a complicated time-consuming and costly process.

U.S. Patents of general interest include the following:

K. Tamkawa, in U.S. Pat. No. 4,458,004 disclose phthalocyanine monomers useful in optical storage and reading.

J. E. Kuder, et al., disclose in U.S. Pat. No. 4,478,782 a dimer acid polyamide resin. Porphyrins are not taught.

K. Y. Law, et al. in U.S. Pat. No. 4,492,750 disclose novel naphthophthalocyanine monomers for use as dyes.

D. E. Nickles, et al., U.S. Pat. No. 4,605,607 discloses an unusual polyimide polymer.

Tsuchida, et al. in U.S. Pat. No. 4,104,466 disclose non-azine polymeric metal ion complexes.

Fukuda, et al. in U.S. Pat. No. 4,772,681 disclose non-azine porphyrin derivatives for cancer diagnosis.

Schmidt, et al. in U.S. Pat. No. 4,614,723 disclose non metal ion-containing porphyrin monomer derivatives as immunoassay markers.

Gotoh, et al. in U.S. Pat. No. 4,816,386 disclose magnesium or aluminum ion-containing phthalocyanine monomer and polymer compositions.

S. C. Narang et al. in U.S. Pat. No. 5,091,502 disclose the synthesis of porphyrin-based metal ion-containing polymers using tetraketone porphyrin monomers and tetramines.

Matsuchita Electric Industries, KK in JP 6-2014321, Jan. 22, 1987, disclose the vapor deposition of phthalocyanine monomers.

Kanegafuchi Chem KK in JP 87258565, Oct. 14, 1987, disclose a porphyrin polymer always having at least one free ester group per unit.

H. Tsuchida, in Japanese Patent No. JP 58010515, Jan. 21, 1983 discloses hydrophobic polyamide urethane polymers containing porphyrin complex polyimides.

Mitsubishi Kaser, JP 8-870723, Mar. 24, 1980, and JP 1-242584, Sep. 27, 1989, and JP 1-242,680, Sep. 27, 1989, disclose a porphyrin amine having the amine on the pendant phenyl substituent.

None of these references individually or collectively teach or suggest the present invention.

All references, articles, patents, standards and the like cited in this application are incorporated by reference in their entirety.

It is therefore desirable to produce new generation polymers which exhibit high thermal stability and good electrical conductivity without undue expense or time. The conjugated porphyrin based polymers of the present invention accomplish these objectives.

SUMMARY OF THE INVENTION

The present invention relates to a polyporphyrin-containing polymer of the structure:

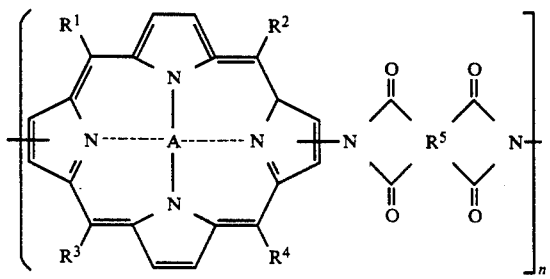

wherein
- $R^1$, $R^2$, $R^3$ and $R^4$ are each independently selected from alkyl having 1 to 6 carbon atoms, phenyl or phenyl substituted with 1 to 3 alkyl groups each having 1 to 6 carbon atoms or with 1 to 3 halogen atoms;
- $R^5$ is independently selected from aryl, substituted aryl, alkylenearyl, alkylene substituted aryl, each having at least one aryl group.
- A in each porphyrin group is independently selected from two individual hydrogen groups, a metal atom and
- n is an integer between 3 and 10,000.

The present invention also relates to a process to produce a polyporphyrin-containing polymer of the structure.

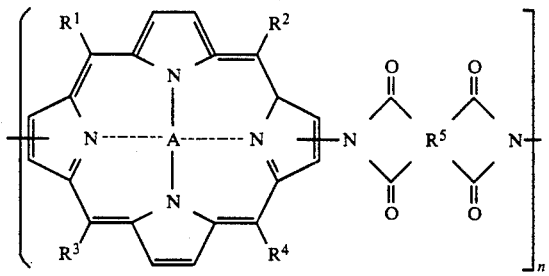

wherein
- $R^1$, $R^2$, $R^3$ and $R^4$ are each independently selected from H, alkyl having 1 to 6 carbon atoms, phenyl or phenyl substituted with alkyl groups having 1 to 6 carbon atoms or with 1 to 3 halogen atoms;
- $R^5$ is independently selected from aryl, substituted aryl, alkylenearyl, alkylene substituted aryl, each having at least one aryl group,
- A in each porphyrin group is independently selected from two individual hydrogen groups or a metal atom; and
- n is an integer between 3 and 10,000;

which process comprises:

(a) mixing 1 equivalent of

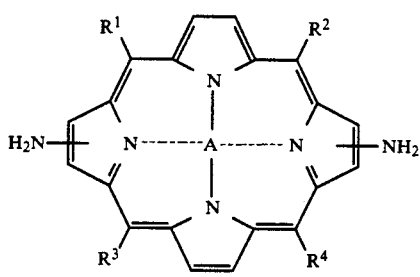

wherein A, R¹, R², R³, and R⁴ are defined above with 1 or more equivalents of:

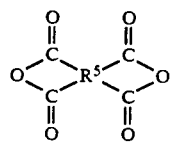

and R⁵ is defined hereinabove, at between about 50° to 100° C. for between about 0.5 to 100 hr;
recovering the polyporphyrin-containing poly(imide) polymer; and optionally
contacting the polymer with an aqueous metal salt; and
optionally recovering the metal ion containing polyporphyrin poly(imide).

BRIEF DESCRIPTION OF THE FIGURES

FIG. 1 shows a reaction for the synthesis and purification the starting material 5,10,15,20 tetraphenylporphyrin (II).

FIG. 2 shows a reaction for the synthesis of a copper (II) porphyrin intermediate.

FIG. 3 shows a reaction for the synthesis of a dinitroporphyrin intermediate.

FIG. 4 shows a reaction sequence for the synthesis of a novel porphyrin (I), where R¹, R², R³, and R⁴ are each phenyl.

FIG. 5 shows a general reaction for the production of a linear metalloporphyrin polymer from porphyrin diamine and a dianhydride.

DETAILED DESCRIPTION OF THE INVENTION AND PREFERRED EMBODIMENTS

Definitions:

"Dianhydride structures" which are used in the present invention refer to, for example, the following known or commercially available structures are shown in Table 1 below:

TABLE 1

| Name | Structure |
|---|---|
| DIANHYDRIDES | |
| pyromellitic dianhydride | 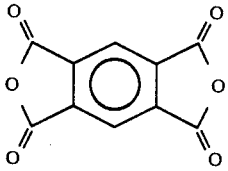 |
| benzophenone dianhydride | 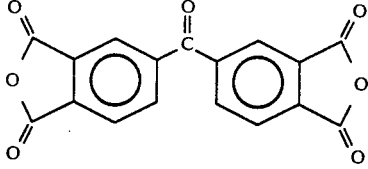 |
| 2,2-bis(3,4-dicarboxyphenyl)propane dianhydride | 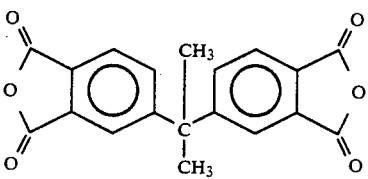 |
| 3,3',4,4'-biphenyltetracarboxylic acid dianhydride | 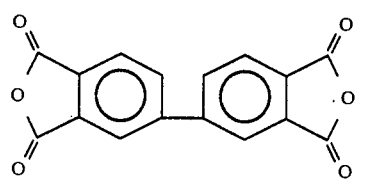 |

TABLE 1-continued
DIANHYDRIDES

| Name | Structure |
|---|---|
| 1,2,5,6-naphthalenetetracarboxylic acid dianhydride | |
| 2,2',3,3'-diphenyltetracarboxylic acid dianhydride | |
| hydroquinone bisether dianhydride | |
| bis(3,4-dicarboxyphenyl) sulfoxide dianhydride | |
| 3,4,9,10-perylene tetracarboxylic acid dianhydride | |
| bis(3,4-dicarboxyphenyl) ether dianhydride | |
| bis(3,4-dicarboxyphenyl) thioether dianhydride | |

TABLE 1-continued
DIANHYDRIDES

| Name | Structure |
| --- | --- |
| bisphenol A bisether dianhydride | *(structure shown)* |
| 2,2-bis(3,4-dicarboxylphenyl)hexafluoropropane dianhydride | *(structure shown)* |
| 2,3,6,7-naphthalenetetracarboxylic acid dianhydride | *(structure shown)* |
| bis(3,4-dicarboxyphenyl) sulfone dianhydride | *(structure shown)* |

"Metal(s)" refers to any atom of the Periodic Table having the properties of a metal. These include preferably all transition metals, actinides and lanthanides. More preferably tin, silicon, germanium, copper, iron, cobalt, zinc, nickel or manganese are used. See *Porphyrins and Metalloporphyrins* by K. M. Smith Elsevier/North-Holland Biochemical Press 1976, which is incorporated herein by reference.

"Metal salt" refers to an organic or inorganic salt used to treat a dihydro-porphyrin structure to produce the corresponding metal porphyrin compound. Acetates and propionates are preferred.

A general description follows for the monomers or polymers.

SYNTHESIS OF THE TETRAKETOPORPHYRIN MONOMER

Referring to FIGS. 1 to 4, is described the synthetic route to obtain a diaminoporphyrin monomer, Compound I, e.g., where R is phenyl.

Tetraphenylporphyrin (Compound II): The preparation of Compound II is obtained according to the procedure reported by A. D. Adler, F. R. Longo, J. D. Finarelli, J. Goldmacher, J. Assour, and L. Korsakoff, *Journal of Organic Chemistry*, 32, 476 (1967), which is incorporated herein by reference. Equimolar quantities of pyrrole and a benzaldehyde are combined using acetic acid or propionic acid.

Different porphyrin compounds are prepared by replacing the benzaldehyde with stoichiometrically equivalent amounts of 4-methylbenzaldehyde, 3,5-dimethylbenzaldehyde, 4-chlorobenzaldehyde, 4-methoxybenzaldehyde, acetaldehyde, propanaldehyde, cyclohexylaldehyde, and the like.

Metal Tetraphenyl Porphyrin (IIa): Compound II is combined with a metal acetate, in a solvent of, for example, chloroform and methanol. The solution is heated at reflux for between about 15 and 30 min. After cooling, the solid product IIa, is obtained by filtration. Different metal acetate reagents will produce different metal porphyrins. Preferred metals include, for example, tin, silicon, germanium, copper, iron, nickel, cobalt, zinc or manganese. Copper is more preferred.

Metal (II) Dinitrotetraphenylporphyrins and their Demetallation: Compound IIIa: The metal (IIa) porphyrin, Compound IIa, is dissolved in excess dipolar aprotic solvent, such as methylene chloride, chloroform or the like, in an inert atmosphere, such as nitrogen or argon. Solvent and a nitrating agent, such as dinitrogen tetraoxide are combined. The nitrating agent solution is slowly added to the methylene chloride solution of the porphyrin. Next, the crude product is contacted with excess concentrated sulfuric acid. The product is carefully poured onto ice/water and extracted. The solid product is Compound III. The infrared, mass and proton nuclear magnetic spectral data are consistent with the dinitroderivative.

Diaminotetraphenylporphyrin-Compound IV: The dinitroporphyrin (Compound III) is dissolved in an aprotic solvent in an inert atmosphere. An alcohol, such as methanol is added. A catalyst, such as palladium on carbon is added to the Compound III solution followed by a borohydride reducing agent, such as sodium borohydride. After filtration and removal of the solvent, the crude residue is purified by column chromatography using a polar solvent to produce diamino compound IV.

FORMATION OF LINEAR PORPHYRIN POLYMERS

Compound I as the porphyrin diamine is contacted with a dianhydride in the presence of a base and an aprotic solvent in the absence of light in an inert atmosphere, and the reaction is refluxed for between 1 and 7 days, preferably between 2 and 4 days. The polymer obtained is subjected to gel permeation chromatography to determine the mean molecular weight of the polymer. Usually a polymer having a molecular weight of about 20,000 daltons or greater (e.g. to about 2,000,000 daltons) is obtained.

These electrically conducting polymers are useful as liquid crystal polymers or initially, the polymers are evaluated by thermal gravimetric analysis (TGA) and differential scanning calorimetry (DSC). The rheological behavior is studied using a rheometrics mechanical spectrometer.

The electrical conductivity of the polymers is determined by the four-point probe method using cast films. The electrical conductivity ($\sigma$) was found for the iodine doped polyporphyrin without metal was between about 1 and $1 \times 10^{-4}$ ohm$^{-1}$cm$^{-1}$. It is expected that these and the other polyporphyrin polymers described herein, including the described metal ions, will exhibit an electrical conductivity of between about 1 and $1 \times 10^{-3}$ to $10^{-5}$ ohm$^{-1}$cm$^{-1}$.

Changes in UV-visible spectra of the polymers with applied potential are determined by casting polymer films on indium-tin oxide (ITO), platinum or gold-coated semitransparent electrodes. Reversibility and response time are determined as is described in published methods. The following examples are provided to be illustrative and descriptive only. They are not to be construed as being limiting in any manner.

GENERAL

The materials and reagents used were obtained from standard chemical supply houses, e.g., Aldrich Chemical Company, Milwaukee, Wisc. and were used without further purification, unless otherwise noted. Also see *Chemical Sources U.S.A.*, published annually by Directories Publications, Inc., Boca Raton, Fla. for starting materials and reagents.

EXAMPLE 1

Purification of Tetraphenylporphyrin 2 3-Dichloro-5 6-dicyano-1,4-benzoquinone (7.5 g) was dissolved in benzene (225.0 ml) and added slowly to the refluxing solution of commercially available tetraphenylporphyrin (30.0 g), Aldrich Chemical Co., Milwaukee, Wis. in ethanol-free chloroform (3.75-l). The reaction mixture was further refluxed under argon for 4-hr, cooled and filtered through a column packed with neutral alumina (500 g). The alumina was further washed with chloroform to recover the crude product as the filtrate. The filtrate was concentrated to about 200-ml using reduced pressure. The purified tetraphenylporphyrin, free from chlorin, was precipitated using methanol. The product was filtered using a vacuum and dried to obtain the pure dried product (26.0 g, 86.7% yield). See FIG. 1.

EXAMPLE 2

Copper (II) Tetraphenylporphyrin (a) A solution of tetraphenylporphyrin (26.0 g, $42.3 \times 10^{-3}$ mol) in chloroform (3.25 l) was refluxed under argon in a 5-l three-necked flask. To this reaction mixture was slowly added, a methanolic solution of copper (II) acetate (prepared by adding methanol (500 ml) to 14.0 g of copper acetate monohydrate). The sparingly soluble copper acetate was further dissolved repeatedly in 500-ml, 200-ml and 200-ml of methanol. The soluble portion was added very slowly to the refluxing solution. UV/VIS spectra and thin layer chromatography using prepared silica plates from Eastman-Kodak, Rochester, N.Y., using dichloromethane eluent, were used to monitor the progress of the reaction. The disappearance of the maxima at 512 $\mu$m and the appearance of another maxima at 538 $\mu$m (for Cu-porphyrin complex) was used to follow the progress and completion of the reaction (about 4-hr). The solvent was removed using reduced pressure to about 300-ml. The copper (II) porphyrin-complex was precipitated by the addition of excess methanol. The precipitated product was filtered using vacuum and dried under vacuum to yield the product: 26.5 g (92.9% yield). See FIG. 2.

(b) Similarly, when Example 2 (a) is repeated except that the copper (II) acetate is replaced by a stoichiometrically equivalent amount of nickel (II) acetate, iron(II) acetate, cobalt (II) acetate or manganese (II) acetate, the corresponding nickel (II), iron (II), cobalt (II), or manganese (II)-containing porphyrin obtained in good yield.

EXAMPLE 3

Copper (II) Dinitrotetraphenylporphyrin

In a 5-l three-necked flask, copper (II) tetraphenylporphyrin (212, ($31.0 \times 10^{-3}$ mol) was dissolved in dry dichloromethane (2.1-l), with stirring, under an argon blanket at ambient temperature. Freshly distilled nitrogen dioxide (4.0-ml) was condensed in a graduated cold finger, diluted with dry dichloromethane (8.0-ml), and transferred into 100-ml of dry dichloromethane in a graduated dropping funnel with the help of a needle transfer in an inert atmosphere. One-half of the solution was added dropwise slowly to the stirred solution of copper (II) tetraphenylporphyrin. Thin layer chromatography (Eastman Kodak silica plate, see above), dichloromethane/hexane; 6/4) performed after 15-min showed the formation of the mononitro complex and some starting material. The second half of the nitrogen dioxide solution was slowly added to the reaction mixture in small portions. Additional distilled nitrogen dioxide was condensed, diluted with dichloromethane (5.0-ml) and transferred into dichloromethane (50-ml) in a graduated dropping funnel. Again small portions of the new nitrogen dioxide solution was added slowly. Thin layer chromatography Eastman Kodak silica plate-dichloromethane as eluent was used to monitor the reaction and showed complete conversion of the mononitro complex to the dinitro complex. No spot was present in the TLC for the starting material. See FIG. 3.

EXAMPLE 4

Dinitrotetraphenylporphyrin

Copper (II) ion-containing dinitrotetraphenylporphyrin (24 g, $31.3 \times 10^{-3}$ mol) was dissolved in dichloromethane (500 ml) and stirred at ambient temperature in a 2-l three-necked flask. To this solution was slowly and carefully added 96% sulfuric acid (100-ml), and then stirred for 30 min. The reaction product was carefully poured into ice cold water, and the aqueous solu-

11 tion was extracted with dichloromethane (3×100-ml). The organic extract was washed with water (3×100-ml), 5% aqueous sodium bicarbonate solution and dried using anhydrous sodium sulfate. The dried extract was separated by filtration, evaporated using reduced pressure and dried to product the crude subject compound, 20.9 g. This product showed no stretching band for C=O at 1720 cm$^{-1}$. The crude product was purified by passing through neutral alumina in dichloromethane to remove the base line. Purified product 19.9 g (90.1% yield) was obtained (without copper ion present). See FIG. 4.

EXAMPLE 5

Diaminotetraphenylporphyrin

A 2-l three-necked round bottomed flask was fitted with a condenser and a dropping funnel to add solid material. To this flask was added anhydrous dichloromethane (850-ml) and methanol (420-ml). To this organic solution was added 10% palladium on carbon (14.0 g), the mixture was stirred under an argon blanket, and then cooled in an ice bath. Sodium borohydride (4.0 g, mol) was added in small portions over about 30-min. Next the dinitrotetraphenylporphyrin (7.0 g, 0.01 mol) and solid sodium borohydride (14.0 g) were added in small portions over about 60-min. The reaction mixture was stirred under argon for 30 min. The reaction mixture was filtered through a layer of CELITE ® (diatomateous earth of Johns Manville, Denver, Colo.) in a Buchner funnel and washed repeatedly with dichloromethane. The solvent was completely removed under reduced pressure to produce a crude residue. The residue was redissolved in dry dichloromethane to separate insoluble CELITE ®, and filtered. The solvent was removed under reduced pressure and dried to produce a purified residue (6.2 g). This residue was flash chromatographed over silica using dichloromethane as eluent. The product obtained (0.6 g, 9.6% yield) was free of impurities. See FIG. 4.

EXAMPLE 6

Diaminotetraphenylporphyrin

Dinitrotetraphenylporphyrin (2.0 g 2.84 mol) was added to a hydrogenation flask (500-ml) and dissolved in dry toluene (200-ml). To this solution was added the catalyst about 10% ruthenium on alumina pellets (4.0 g, from Engelhard Industries, Iselin, N.J.). After evacuation, and flushing with hydrogen, the reduction was performed at 70° at 60 psi for 8-hr. Next, the flask was cooled to ambient temperature, filtered in the dark to remove the catalyst. The solid catalyst was washed repeatedly with toluene to obtain the product. The organic solvent was removed under reduced pressure in the dark at 50° C. to produce the crude solid residue. This residue showed one spot above the two spots near the base line for the product. An additional brown spot very close to the starting material was also observed. The residue was 1.6 g

EXAMPLE 7

Porphyrin Poly (Imide) Formation (a) A solution of diamino tetraphenyl porphyrin (200 mg, 31.0×10$^{-5}$ mol) and pyromellitic anhydride (70 mg, 31.1×10$^{-5}$ mol) in anhydrous dimethylformamide (7.0-ml) was refluxed at 170° C. in an argon blanket for 7 days. The solvent was removed under reduced pressure to produce the crude residue. Methanol was added and the insoluble material was filtered using reduced pressure, washed repeatedly with methanol and dried to produce the polymer (250 mg). The molecular weight is between about 20,000 and 2,000,000 daltons. See FIG. 5.

(b) Similarly when the phthaldicarboxylic dianhydride is independently replaced by a stoichiometrically equivalent of a dianhydride of the structures found in Table 1 above, the corresponding polytetraphenylporphyrin is obtained respectively.

EXAMPLE 8

Copper (II) Containing Polytetraphenylporphyrinpoly (Imide)

The polyporphyrin produced in Example 7(a) is then contacted with an aqueous copper acetate solution at ambient conditions for 24 hr. The copper containing polyporphyrin is obtained.

EXAMPLE 9

Electrical Conductivity

The polyporphyrin of Example 7(a) (without metal ion) having a molecular weight of about 2,000,000 daltons is subjected to conventional electrical conductivity measurements; producing an electrical, conductivity = 7.3×10$^{-4}$ ohm

EXAMPLE 10

Thermal Gravimetric Analysis (TGA)

The polyporphyrin of Example 7(a) is subjected to standard TGA condition in air. The decomposition temperature ($T_D$) is 405° C. (5% weight loss).

While only a few embodiments of the invention have been shown and described herein, it will become apparent to those skilled in the art that various modifications and changes can be made in a metal ion porphyrin-containing poly(imide) and their method of manufacture without departing from the spirit and scope of the present invention. All such modifications and changes coming within the scope of the appended claims are intended to be carried out thereby.

What is claimed is:

1. A polyporphyrin-containing polymer of the structure:

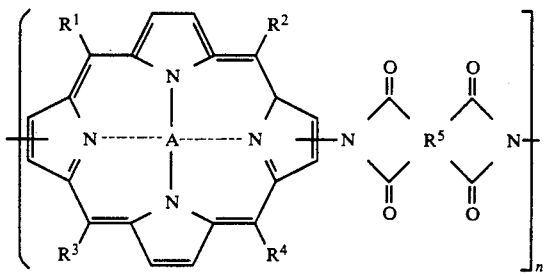

wherein R$^1$, R$^2$, R$^3$ and R$^4$ are each independently selected from H, alkyl having 1 to 6 carbon atoms, phenyl or phenyl substituted with 1 to 3 alkyl groups each having 1 to 6 carbon atoms or with 1 to 3 halogen atoms;

R$^5$ is independently selected from aryl, substituted aryl, alkylenearyl, alkylene substituted aryl, wherein at least one aryl group is present;

A in each porphyrin group of the polymer is independently selected from two hydrogen groups or a metal atom selected from tin, silicon, germanium, a transition metal, an actinide metal or a lanthanide metal; and n is an integer between 3 and 10,000.

2. The polyporphyrin-containing polymer of claim 1 wherein A is independently selected from tin, silicon, germanium, iron, copper, cobalt, nickel, zinc or manganese.

3. The polyporphyrin-containing polymer of claim 1 wherein $R^1$, $R^2$, $R^3$ and $R^4$ are each phenyl.

4. The polyporphyrin-containing polymer of claim 1 wherein A is independently selected from 2 hydrogen atoms, tin, silicon, germanium, iron, copper, cobalt, nickel, zinc or manganese.

5. The polyporphyrin-containing polymer of claim 1 wherein A is copper.

6. The polyporphyrin-containing polymer of claim 1 wherein $R^5$ is independently selected from:

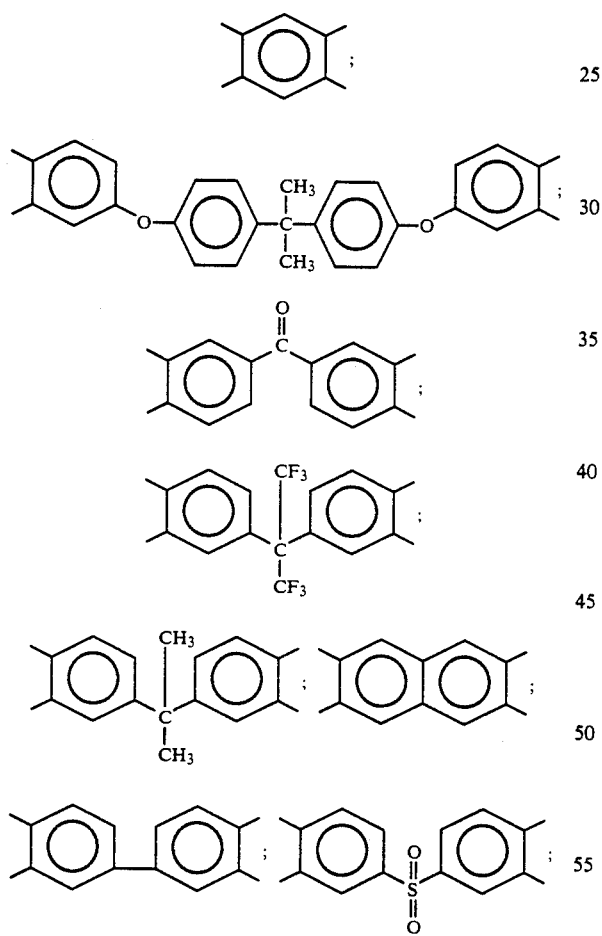

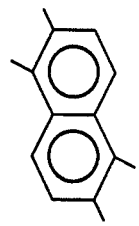

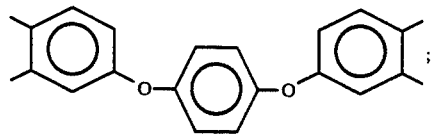

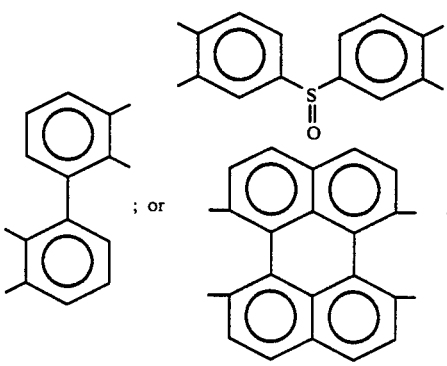

7. The porphyrin-containing polymer of claim 1 wherein $R^5$ is

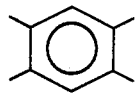

and the average molecular weight of the polymer is between 10,000 and 2,000,000.

8. The porphyrin-containing polymer of claim 1 wherein the molecular weight of the polymer is between about 100,000 and 2,000,000.

9. The iodine-doped porphyrin containing polymer of claim 1 wherein the electrical conductivity of the iodine-doped polymer is between about $1 \times 10^{-4}$ and $1 \times 10^{-5}$ ohm$^{-1}$ cm$^{-1}$.

10. A process to produce a polyporphyrin-containing polymer of the structure:

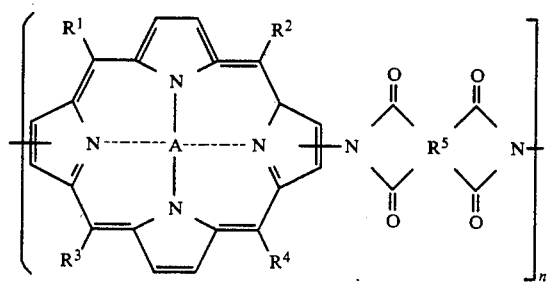

wherein $R^1$, $R^2$, $R^3$ and $R^4$ are each independently selected from H, alkyl having 1 to 6 carbon atoms, phenyl or phenyl substituted with alkyl groups having 1 to 6 carbon atoms or with 1 to 3 halogen atoms;

R⁵ is independently selected from aryl, substituted aryl, alkylenearyl or alkylene substituted aryl, wherein at least one aryl group is present;

A in each porphyrin group of the polymer is independently selected from two hydrogen groups or a metal atom selected from the group consisting of tin, silicon, germanium, a transition metal, an antinide metal and a lanthanide metal; and n is an integer between 3 and 10,000;

which process comprises:

(a) mixing 1 equivalent of

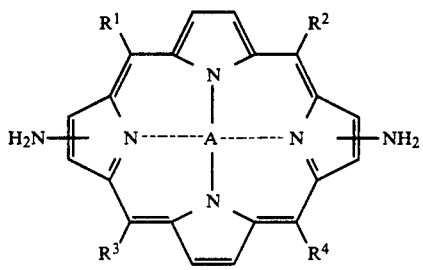

wherein A, R¹, R², R³ and R⁴ are defined above with 1 or more equivalents of aryl dianhydride of the structure:

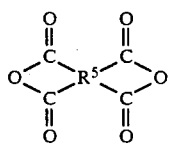

and R⁵ is defined hereinabove, at 50° to 100° C. for 0.5 to 1 hr; and recovering the polyporphyrin-containing poly(imide) polymer.

11. The process of claim 10 wherein: R⁵ is independently selected from:

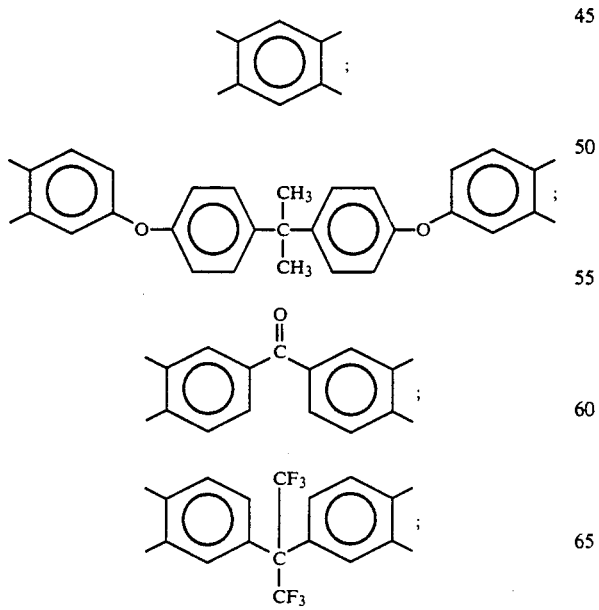

-continued

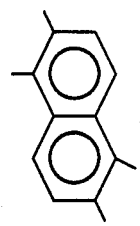

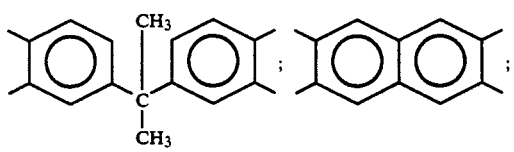

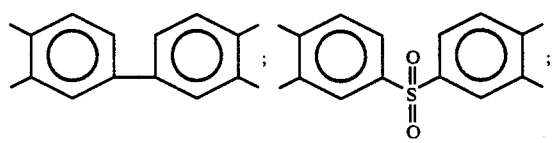

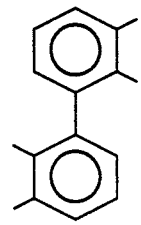

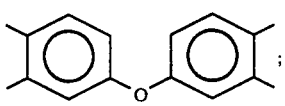

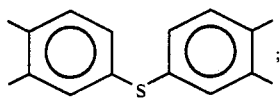

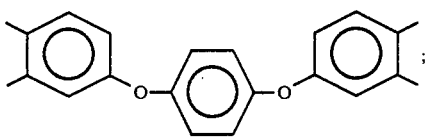

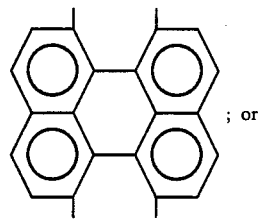
; or

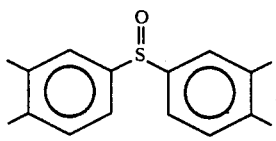

12. The product polymer of the process of claim 11 wherein the conductivity of the iodine-doped porphyrin-polymer is between about $1 \times 10^{-3}$ and $1 \times 10^{-5}$ ohm$^{-1}$ cm$^{-1}$.

13. The process to produce the polyporphyrin-containing polymer of claim 10 wherein A in each porphyrin group is independently selected from the group consisting of tin, silicon, germanium, iron, copper, cobalt, nickel, zinc and manganese.

14. The process to produce the polyporphyrin-containing polymer of claim 10 wherein $R^1$, $R^2$, $R^3$ and $R^4$ are each phenyl.

15. The process to produce the polyporphyrin-containing polymer of claim 10 wherein A in each porphyrin group is independently selected from the group consisting of 2 hydrogen atoms, tin, silicon, germanium, iron, copper, cobalt, nickel, zinc and manganese.

16. The process to produce the polyporphyrin-containing polymer of claim 10 wherein A is copper.

17. The process to produce the polyporphyrin-containing polymer of claim 10 wherein $R^5$ is independently selected from:

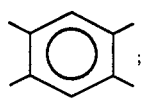

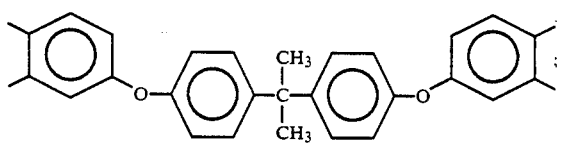

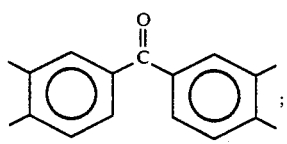

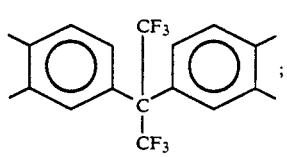

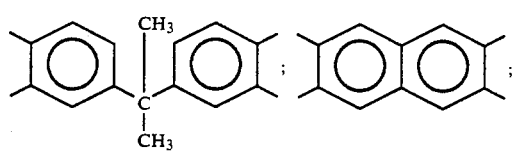

-continued

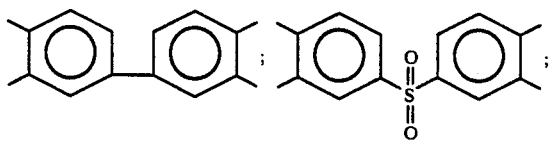

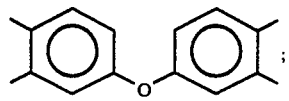

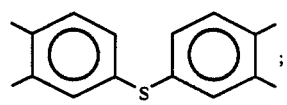

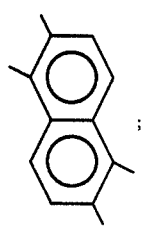

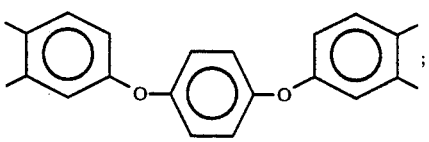

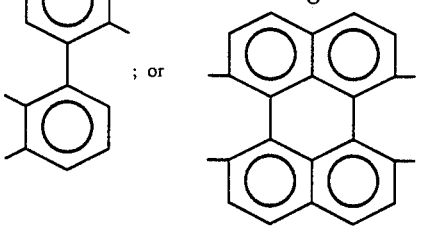

; or

18. The process to produce the porphyrin-containing polymer of claim 17 wherein $R^5$ is

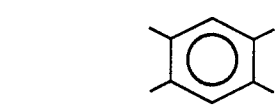

and the average molecular weight of the polymer is between 10,000 and 2,000,000.

19. The process to produce the porphyrin-containing polymer of claim 18 wherein the molecular weight of the polymer is between about 100,000 and 2,000,000.

* * * * *